John Henry Shelley - Inventor
Hall, Pollock & Vande Sande
— Attorneys

United States Patent Office 3,430,119
Patented Feb. 25, 1969

3,430,119
OSCILLATING MOTOR FOR HOROLOGICAL INSTRUMENTS
John Henry Shelley, Edismore, Eastcombe, near Stroud, England, assignor to Smiths Industries Limited, London, England
Filed July 19, 1966, Ser. No. 566,274
Claims priority, application Great Britain, July 22, 1965, 31,342/65
U.S. Cl. 318—128  8 Claims
Int. Cl. H02p 5/16; H02k 33/14; G04c 3/04

This invention relates to horological instruments and in particular to electrically maintained balances. According to one aspect of this invention this is provided on an electrically maintained balance comprising a balance mounted for rotation about an axis and spring restrained towards a datum position so that it may oscillate about the datum position, two flat coils similarly mounted apart on the balance so that as the balance oscillates the two coils have a common path of movement which substantially lies in a surface of revolution about the said axis, fixed magnetic means establishing a region of magnetic flux in which the flux intersects the said path of movement, the position of the coils on the balance being such that when the balance is in its datum position the coils lie respectively on either side of the said region, electric pulse generating means connected to the coils, and means responsive to the angular position of the balance acting on the pulse generating means to cause it to pass current pulses through the coils when they are passing through the said region so as to maintain the oscillations, the balance thereby receiving for each direction of swing two distinct maintaining impulses at equal time intervals before and after the balance passes through the datum position.

Preferably the coils lie in a plane perpendicular to the said axis and the magnetic flux in the said region is parallel to the said axis.

According to another aspect of this invention there is provided an electrically maintained balance comprising a balance mounted for rotation about an axis and spring restrained towards a datum position so that it may oscillate about the datum position, two flat coil assemblies each comprising an inner trigger coil and an outer drive coil, the assemblies being similarly mounted apart on the balance so that as the balance oscillates the two assemblies have a common path of movement which substantially lies in a surface of revolution about the said axis, fixed magnetic means establishing a region of high density magnetic flux (of the order of 4000 Gauss or above) in which the flux intersects the said path of movement, the position of the assemblies being such that when the balance is in its datum position the assemblies lie respectively on either side of the said region, electric pulse generating means connected to the trigger and drive coils and causing current pulses to pass through the drive coils in response to triggering pulses induced in the trigger coils by passage through the said region so that the balance receives for each direction of swing two distinct maintaining impulses at equal time intervals before and after the balance passes through the datum position.

Preferably the coil assemblies lie in a plane perpendicular to the said axis and the magnetic flux in the said region is parallel to the said axis.

Preferably the trigger coils and the drive coils each have two opposite limbs which are situated substantially radially with respect to the said axis and the said region is bounded by two opposite sides which are substantially radial with respect to the said axis.

Preferably the dimensions and dispositions of the drive coils and trigger coils in relation to the dimensions of the said region are such that the following conditions are satisfied:

(i) In the datum position of the balance the drive coils partially project into the said region but the trigger coils lie outside it.

(ii) When the balance passes through the datum position in either direction the current pulse in the trailing drive coil does not commence until the leading drive coil has moved out of the said region.

(iii) When each coil assembly passes through the said region in either direction the leading radial limb of its drive coil begins to move out of the region immediately after the trailing radial limb of its trigger coil has entered the region.

Preferably the two trigger coils are connected together in series in the appropriate sense and the two drive coils are also connected together in series in the appropriate sense.

This invention may be used in conjunction with the invention described in my co-pending application Ser. No. 404,424 filed Oct. 16, 1964.

An electrically maintained balance in accordance with this invention will now be described with reference to the accompanying drawings of which:

Figure 1:
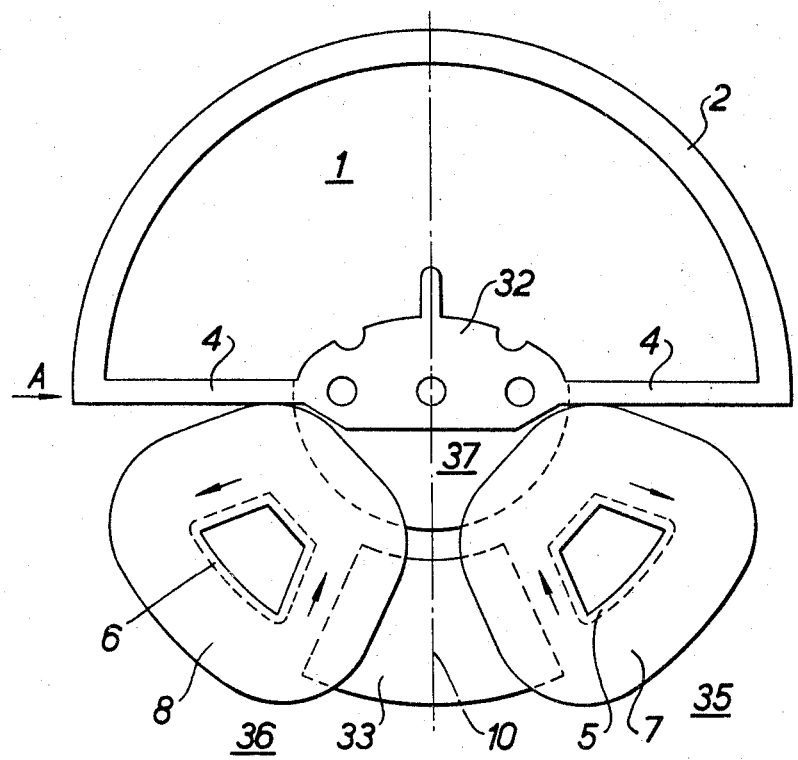
FIGURE 1 is a schematic plan view of the balance with some parts removed.

Balance 1 is mounted on a spindle 31 supported in bearings 39 and 40 for rotation about the axis 3 of the spindle. The balance 1 has an arcuate portion 2 which extends for 180° about the axis 3 on which it is centered. The ends of the arcuate portion 2 are connected to the central portion 32 of the balance by two spokes 4. Two trigger coils 5 and 6, and two drive coils 7 and 8 are carried by the balance. The coils 7 and 8 are wound on the outside of the coils 5 and 6 respectively. The coil 6 is wound separately after the coil 5 is wound without breaking the wire, and similarly the coil 8 is wound after the coil 7 is wound without breaking the wire. The coils 5 and 7 and the coils 6 and 8 are both flat self-supporting assemblies held between plates 37 and 38 attached to the central portion 32 of the balance, so that the assemblies lie in the plane of the balance. Viewed as in FIGURE 1, the direction of wind of coil 5 is opposite to that of coil 6, and the direction of wind of coil 7 is opposite to that of coil 8. Coils 5 and 6 are electrically identical, as are coils 7 and 8. Two magnets 33 and 34 are disposed adjacent to each other with a gap between their opposed faces which are oppositely polarised so that the gap is a region of high flux density, e.g. 5000 Gauss. A flux return assembly is indicated at 44. The gap is such that the coils can pass through it during the rotational oscillations of the balance. The centre line 10 of the magnets and of the gap is at right angles to the spokes 4 in the datum angular position of the balance 1 (that shown). Furthermore, in the datum angular position of the balance 1 the coils 5 and 7 and the coils 6 and 8 are disposed on opposite sides of the gap and the magnets. The gap subtends an angle of about 50° about the axis 3. The arcuate portion 2 of the balance is at a greater radius than the magnets 33 and 34 so that it never enters the gap.

Figure 2:
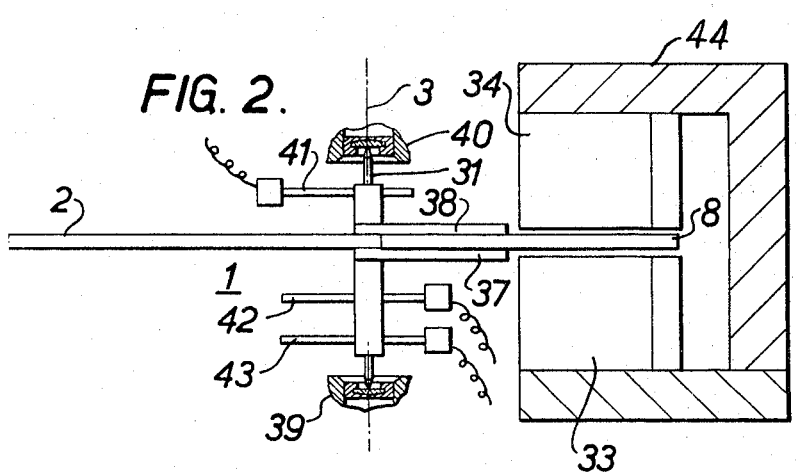
FIGURE 2 is a side view of the balance and spindle from the direction of the arrow A in FIGURE 1.
Figure 3:
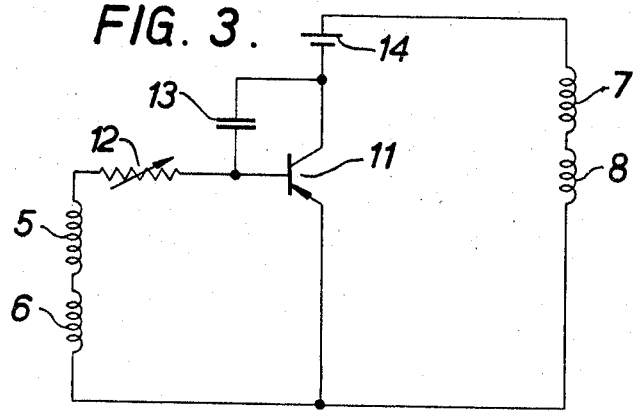
FIGURE 3 is a circuit diagram.

Referring now to FIGURES 2 and 3, the free ends of the coils 6 and 8 are connected together and through a hairspring 41 to the emitter of a transistor 11. The end of coil 5 distant from the coil 6 is connected through a hairspring 42 and a variable resistor 12 to the base of the transistor 11. The collector of the transistor 11 is connected to the base of the transistor through a capacitor 13 and to the negative terminal of a battery 14. The positive terminal of the battery 14 is connected through a hairspring 43 to the end of the coil 7 distant from coil 8. The battery 14 may be a mercury cell having a potential difference of 1.35 volts across its terminals. Two of the hairsprings have very small stiffnesses and have virtually no effect on the motion of the balance whereas the third hairspring regulates the motion of the balance in the usual way.

The overall operation will now be described. During each swing of the balance 1 E.M.F.'s are induced in the trigger coils 5 and 6 as they pass through the flux in the gap between the magnets. The E.M.F.'s switch the transistor 11 "ON" so that current flows through the coils 7 and 8 and that current interacts with the flux in the magnetic gap to produce a force on the balance in the sense to maintain the oscillations of the balance. The balance 1 swings about the axis 3 through an angle of about 220° so that the spokes 4 are not close to the gap between the magnets when the balance reaches its extreme angular position. The spindle 31 may drive the hands of a clock through a conventional drive mechanism (not shown) for converting the oscillatory motion of the spindle into unidirectional motion.

Figure 4:
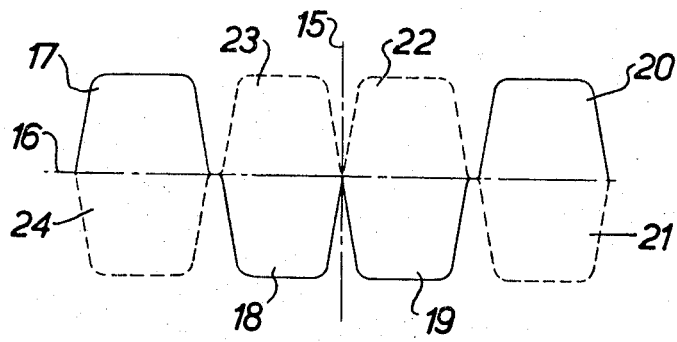
FIGURE 4 is a graph showing E.M.F.'s induced in the trigger coils of the balance.

FIGURE 4 shows the shape of the E.M.F.'s induced in the trigger coils, the full line indicating the E.M.F. induced during the clockwise motion of the balance whereas the dotted line indicates the E.M.F. induced during the anticlockwise motion. The line 15 indicates the datum position of the balance 1 and it will be assumed the movement to the right in FIGURE 4 is clockwise motion and movement to the left is anticlockwise motion. It is further assumed that the E.M.F. shown as above the line 16 (referred to hereinafter as "a positive E.M.F.") is in the sense to switch the transistor 11 "off" whereas the E.M.F. shown as below the line 16 (referred to hereinafter as "a negative E.M.F.") is in the sense to bias the transistor 11 "on." During a clockwise swing as the leading limb of coil 6 passes through the gap a positive E.M.F. (indicated at 17) is induced in the coil 6 whereas when the trailing limb of coil 6 passes through the gap a negative E.M.F. 18 is induced. Subsequently as the leading and trailing limbs of the coil 5 pass through the gap, negative and positive E.M.F.'s 19 and 20 respectively are induced, the negative E.M.F. being produced before the positive E.M.F. because the direction of wind of coil 5 is the opposite to that of coil 6. During an anticlockwise swing of the balance 1 as the leading and trailing limbs of the coil 5 pass through the gap negative and positive E.M.F.'s 21 and 22 respectively are induced and as the leading and trailing limbs of the coil 6 pass through the gap positive and negative E.M.F.'s 23 and 24 respectively are induced. It will be realised that a limb which is the leading limb during a clockwise swing becomes the trailing limb during an anticlockwise swing and vice versa. Each negative E.M.F. induced in the trigger coils switches the transistor 11 "ON" and causes a flow of current in the directions indicated by the arrows through the drive coils. Thus during a clockwise swing of the balance, forces are exerted on the trailing limb of the coil 8 and the leading limb of the coil 7 in the sense to move the balance 1 in the clockwise direction, whereas during an anticlockwise swing, forces are exerted on the leading limb of the coil 7 and the trailing limb of the coil 8 in the sense to move the balance in the anticlockwise direction. It will be seen from FIGURE 4 that the forces are exerted on the balance 1 at equal time intervals before and after the balance 1 passes through its datum angular position.

I claim:

1. An electrically maintained balance comprising a balance mounted for rotation about an axis and spring restrained towards a datum position so that it may oscillate about the datum position, two flat coils similarly mounted apart on the balance so that as the balance oscillates the two coils have a common path of movement which substantially lies in a surface of revolution about the said axis, fixed magnetic means establishing a region of magnetic flux in which the flux intersects the said path of movement, the position of the coils on the balance being such that when the balance is in its datum position the coils lie respectively on either side of the said region, electric pulse generating means connected to the coils, and means responsive to the angular position of the balance acting on the pulse generating means to cause it to pass current pulses through the coils when they are passing through the said region so as to maintain the oscillations, the balance thereby receiving for each direction of swing two distinct maintaining impulses at equal time intervals before and after the balance passes through the datum position.

2. An electrically maintained balance as claimed in claim 1 wherein the coils lie in a plane perpendicular to the said axis and the magnetic flux in the said region is parallel to the said axis.

3. An electrically maintained balance comprising a balance mounted for rotation about an axis and spring restrained towards a datum position so that it may oscillate about the datum position, two flat coil assemblies each comprising an inner trigger coil and an outer drive coil, the assemblies being similarly mounted apart on the balance so that as the balance oscillates the two assemblies have a common path of movement which substantially lies in a surface of revolution about the said axis, fixed magnetic means establishing a region of high density magnetic flux (of the order of 4000 Gauss or above) in which the flux intersects the said path of movement, the position of the assemblies being such that when the balance is in its datum position the assemblies lie respectively on either side of the said region, electric pulse generating means connected to the trigger and drive coils and causing current pulses to pass through the drive coils in response to triggering pulses induced in the trigger coils by passage through the said region so that the balance receives for each direction of swing two distinct maintaining impulses at equal time intervals before and after the balance passes through the datum position.

4. An electrically maintained balance as claimed in claim 3 wherein the coil assemblies lie in a plane perpendicular to the said axis and the magnetic flux in the said region is parallel to the said axis.

5. An electrically maintained balance as claimed in claim 4 wherein the trigger coils and the drive coils each have two opposite limbs which are situated substantially radially with respect to the said axis and the said region is bounded by two opposite sides which are substantially radial with respect to the said axis.

6. An electrically maintained balance as claimed in claim 5 wherein the dimensions and dispositions of the drive coils and trigger coils in relation to the dimensions of the said region are such that the following conditions are satisfied:

(i) In the datum position of the balance the drive coils partially project into the said region but the trigger coils lie outside it.

(ii) When the balance passes through the datum position in either direction the current pulse in the trailing drive coil does not commence until the leading drive coil has moved out of the said region.

(iii) When each coil assembly passes through the said region in either direction the leading radial limb of its drive coil begins to move out of the said region immediately after the trailing radial limb of its trigger coil has entered the region.

7. An electrically maintained balance as claimed in claim 6 wherein the two trigger coils are connected together in series in the appropriate sense and the two drive coils are also connected together in series in the appropriate sense.

8. An electrically maintained balance as claimed in claim 7 wherein the pulse generating means comprise a D.C. voltage source and a transistor amplifier fed from the source and having an input connected to the trigger coils in the appropriate sense and an output connected to the drive coils in the appropriate sense.

References Cited

UNITED STATES PATENTS

| 2,986,683 | 5/1961 | Lavet et al. | 318—132 |
| 3,095,528 | 6/1963 | Döme | 318—132 |
| 3,327,190 | 6/1967 | Reich | 318—128 |
| 3,365,635 | 1/1968 | Shelley | 318—128 |

FOREIGN PATENTS

| 327,359 | 3/1958 | Switzerland. |
| 921,948 | 3/1963 | Great Britain. |

MILTON O. HIRSHFIELD, *Primary Examiner.*

D. F. DUGGAN, *Assistant Examiner.*

U.S. Cl. X.R.

318—132; 310—36; 58—23, 28